United States Patent [19]

Hisasue et al.

[11] 4,166,165
[45] Aug. 28, 1979

[54] TERPOLYMERS OF TETRAFLUOROETHYLENE, ETHYLENE AND FLUOROVINYL ETHER AND PROCESS FOR PRODUCING THE SAME

[75] Inventors: Michio Hisasue; Shun-ichi Kodama, both of Yokohama, Japan

[73] Assignee: Asahi Glass Company, Ltd., Tokyo, Japan

[21] Appl. No.: 906,436

[22] Filed: May 17, 1978

[30] Foreign Application Priority Data

May 20, 1977 [JP] Japan .................................. 52-57656

[51] Int. Cl.$^2$ .................... C08F 210/02; C08F 214/26
[52] U.S. Cl. ................................. 526/87; 204/159.22; 428/422; 526/206; 526/227; 526/245; 526/247
[58] Field of Search .................. 204/159.22; 526/206, 526/227, 245, 247, 87

[56] References Cited

U.S. PATENT DOCUMENTS

| | | | |
|---|---|---|---|
| 3,528,954 | 9/1970 | Carlson | 526/206 |
| 3,546,186 | 12/1970 | Gladding et al. | 526/245 |

*Primary Examiner*—Harry Wong, Jr.
*Attorney, Agent, or Firm*—Oblon, Fisher, Spivak, McClelland & Maier

[57] ABSTRACT

Terpolymers of tetrafluoroethylene and ethylene essentially consist of components of from 40 to 60 mole % of tetrafluoroethylene, 40 to 60 mole % of ethylene and 0.1 to 10 mole % of fluorovinyl ether component having the formula

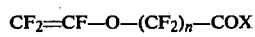

$$CF_2=CF-O-(CF_2)_n-COX$$

wherein X is selected from the group consisting of F, OH, OR$^1$ and NR$^2$R$^3$ and R$^1$ represents a C$_1$-C$_{10}$ alkyl group and R$^2$ and R$^3$ respectively represent hydrogen atom or R$^1$ and n represents an integer of 1 to 10.

Said terpolymer has a volumetric flow rate of 10 to 500 mm$^3$/sec. defined in the specification.

The terpolymers of tetrafluoroethylene and ethylene are produced by copolymerizing tetrafluoroethylene and ethylene with a molar ratio of C$_2$F$_4$/C$_2$H$_4$ being kept essentially higher than 40/60 in the reactor in the presence of a small amount of a perfluoroalkyl vinyl monomer having the formula

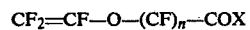

$$CF_2=CF-O-(CF)_n-COX$$

wherein X and n are defined above.

31 Claims, No Drawings

TERPOLYMERS OF TETRAFLUOROETHYLENE, ETHYLENE AND FLUOROVINYL ETHER AND PROCESS FOR PRODUCING THE SAME

BACKGROUND OF THE INVENTION

The present invention relates to novel terpolymers of tetrafluoroethylene and ethylene and a process for producing the same. More particularly, it relates to novel terpolymer of tetrafluoroethylene and ethylene having improved properties which are produced by copolymerizing tetrafluoroethylene and ethylene with a small amount of a specific fluorovinyl ether, and the process for producing the same.

It has been known to produce copolymers of tetrafluoroethylene and ethylene which are characterized by excellent chemical resistance and excellent thermal stability and good electrical properties by copolymerizing tetrafluoroethylene and ethylene in the presence of a polymerization initiator. These copolymers are known to be useful as a raw materials for preparing various shaped articles, electric wire coating and corrosion resistant linings, and coatings, etc., because of their excellent properties, and significant melt processability.

It has been proposed to copolymerize tetrafluoroethylene and ethylene with an auxiliary amount of a vinyl comonomer which has no telogen activity and causes a side chain having at least two carbon atoms in order to improve physical characteristics at high temperature especially tensile characteristics at high temperature for copolymers of tetrafluoroethylene and ethylene (such as Japanese Patent Publication No. 23671/1972, U.S. Pat. No. 3,624,250, and British Pat. No. 1,292,643).

In accordance with these processes, it is possible to overcome the disadvantage that a coating of a copolymer of tetrafluoroethylene and ethylene on a wire becomes brittle at high temperature to cause cracks even under low stress.

However, when the vinyl comonomer which forms a side chain having at least two carbon atoms, is used, the advantageous effect can be attained for improvement of tensile characteristics at high temperature but various disadvantages are found in industrial purposes. For example, when the copolymerization of tetrafluoroethylene and ethylene is carried out by adding a perfluoroolefin having the formula $$CF_2=CF-Rf$$

such as $$CF_2=CF-C_2F_5 \text{ and } CF_2=CF-C_4F_9,$$

the reaction velocity of the copolymerization is remarkably low. When a hydrofluoroolefin or a vinyl ester comonomer such as $$CH_2=CH-CH_2-C(CF_3)_2OH \text{ or}$$

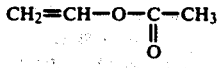

is copolymerized, the resulting copolymer has a lower heat resistance, for example, the heat resistance of longer than 200 hours in an ageing test at 230° C. for measuring the period for which the elongation at 23° C. becomes half compared with initial elongation is decreased to 80 to 100 hours or lower by the introduction of the side chain in the copolymer of tetrafluoroethylene and ethylene.

In U.S. Pat. No. 3,624,250 and British Pat. No. 1,292,643, vinyl monomers having a multiple bond, an acidic group or an ester group in the side chain are not used as the vinyl monomers having a large side chain. For example, vinyl esters, unsaturated carboxylic acids, and alkyl esters of unsaturated carboxylic acid are not used. It is not clearly understood the reason why such vinyl monomers are not used, but it is presumed to be for reason of inferior heat resistance in ageing etc. It is difficult to improve the tensile characteristics at high temperature without copolymerizing them in high degree when vinyl acetate is used. As the result, the inferior heat resistance in ageing and inferior tensile creep property result.

SUMMARY OF THE INVENTION

It is an object of the present invention to provide terpolymers of tetrafluoroethylene and ethylene which have excellent physical properties and an improved tensile characteristics at high temperature without deterioration of the tensile creep property and the heat resistance even though a fluorovinyl ether having a multiple bond and an ester group in the side chain is used.

The foregoing and other objects of the present invention has been attained by providing novel terpolymers of tetrafluoroethylene and ethylene which have a molar ratio of $C_2F_4$ to $C_2H_4$ of 40:60 to 60:40 and 0.1 to 10 mole % of fluorovinyl ether component having the formula $$CF_2=CF-O-(CF_2)_n-COX$$

wherein X represents F, OH, $OR^1$ or $NR^2R^3$ and $R^1$ represents a $C_1-C_{10}$ alkyl group and $R^2$ and $R^3$ respectively represent hydrogen atom or $R^1$ and n represents an integer of 1 to 10.

DETAILED DESCRIPTION OF THE PREFERRED EMBODIMENTS

The initial thermal decomposition temperature of the terpolymer of tetrafluoroethylene and ethylene with 0.25 mole % of vinyl benzoate as the third component measured by the differential thermal analysis is 345° C. whereas that of the copolymer of tetrafluoroethylene and ethylene is 355° C.

The terpolymer having 0.4 mole % of vinyl acetate component as the third component causes significant coloring in a molding.

The effect for improving mechanical strength at high temperature is not high even though about 1 mole % of the vinyl ester is incorporated.

On the contrary, the terpolymers of the present invention have an initial thermal decomposition temperature of 355° C. with high thermal stability as that of the copolymer and have no coloring in a molding, and moreover, the tensile strength at high temperature is remarkably improved by the incorporation of only about 0.5 mole % of the third component in the present invention.

The volumetric flow rate used in the specification is defined as follows. 1 g of a sample of the copolymer is extruded through a nozzle having a diameter of 1 mm and a length of 2 mm under a load of 30 Kg/cm² at a predetermined temperature by using a Kōka-type flow tester. The volume of the extrudate per unit time is defined as the volumetric flow rate and the unit is mm³/sec. The predetermined temperature can be temperature range at which the ethylene-tetrafluoroethylene copolymer is melt-processable. That is, a temperature range between the temperature at which melt flow begins and the temperature at which thermal decomposition begins and it is near the temperature at which melt flow begins, i.e. the flowing temperature.

The predetermined temperature is selected from 260°–360° C. for ethylene-tetrafluoroethylene copolymer. The temperature used to measure the volumetric flow rate is lower than the temperature at which thermal decomposition of the terpolymer begins.

In the examples, the volumetric flow rate was measured at 300° C.

The tensile characteristic at high temperature is measured by the Mandrel wrap test as well as the tensile strength test at high temperature.

The Mandrel wrap test is as follows.

A sample sheet having a rectangular shape (width: 6.4 mm; thickness: 1.3±0.1 mm; length: 127 mm) is wound on a Mandrel having a diameter of 6.4 mm and both ends of the sample sheet are fixed on the Mandrel with bolts and nuts, and the sample maintained at a specific temperature for 96 hours. It is known that a cracking is formed in the sample sheet made of a terpolymer having inferior elongation and strength at high temperature.

For example, the crack is formed at 110° to 120° C. in the sample of the copolymer of $C_2F_4$—$C_2H_4$ whereas no crack is formed at higher than 200° C. in the sample of the terpolymer of the present invention.

The Mandrel wrap test has been known as the test method of thermal stress cracking of polyethylene and details of the test method is described in Federal Specification LP 390C.

The present invention is also to provide a process for producing the novel terpolymer of tetrafluoroethylene and ethylene having 0.1 to 10 mole % of said fluorovinyl ether component by copolymerizing tetrafluoroethylene and ethylene with the molar ratio of $C_2F_4$ to $C_2H_4$ being kept essentially higher than 40/60 in the presence of a polymerization initiator and a small amount of the fluorovinyl ether having the formula $$CF_2=CF-O(CF_2)_n-COX.$$

The terpolymers of tetrafluoroethylene and ethylene produced by the process of the invention have an improved tensile strength and elongation at high temperature without substantial deterioration of excellent physical properties. Accordingly, the coating of the terpolymer of the invention on a wire is not brittle at high temperature and does not cause cracks under any stress.

The novel terpolymers of the present invention have a volumetric flow rate of 10 to 500 mm³/sec. preferably 20 to 300 mm³/sec.

Since the volumetric flow rate of the terpolymer is in said range, melt fabrications such as an extrusion molding and an injection molding can be easily attained and a baking in a powder coating and a dispersion coating can be easily attained.

The novel terpolymers of the present invention have a flowing temperature of higher than 240° C. preferably 250° to 280° C. and an initial thermal decomposition temperature of higher than 310° C. preferably 330° to 370° C. Accordingly, the terpolymers of the present invention can be easily fabricated in the melt and have excellent heat resistance, and moreover, the tensile characteristics at high temperature are further improved.

In the process of producing novel terpolymers of the invention, the molar ratio of tetrafluoroethylene to ethylene in the monomer mixture is preferably greater than 2.35 and especially greater than 3. In the preferable embodiments, the molar ratio is maintained in said range during the copolymerization. For example, the initial feed molar ratio of $C_2F_4$ to $C_2H_4$ is selected in said range and the copolymerization is carried out by feeding tetrafluoroethylene and ethylene so as to supply the amounts corresponding to the consumptions. Accordingly, in the process of the invention, the initial feed molar ratio of $C_2F_4$ to $C_2H_4$ is selected from the range of 70/30 to 90/10 preferably 75/25 to 85/15.

The copolymerization is carried out by supplying a mixture of tetrafluoroethylene and ethylene with a molar ratio of $C_2F_4$ to $C_2H_4$ of 40/60 to 60/40 preferably 45/55 to 55/45, whereby the terpolymer having a tetrafluoroethylene content of 40 to 60 mole % preferably 45 to 55 mole % can be obtained.

The specific fluorovinyl ether monomers used in the present invention have the formula $$CF_2=CF-O-(CF_2)_n-COX$$

wherein n represents an integer of 1 to 10 preferably 2 to 6 and X represents F, OH, $OR^1$ or $NR^2R^3$ and preferably F, OH or $OR^1$ especially $OR^1$ from the viewpoint of easy availability and easy copolymerizing reaction and physical properties of the resulting copolymer.

In the formula, $R^1$ represents a $C_1$–$C_{10}$ alkyl group preferably a $C_1$–$C_5$ alkyl group which can be a straight chain or a branched chain form and $R^2$ and $R^3$ respectively represent hydrogen atom or $R^1$.

The syntheses of the fluorovinyl ethers are described in British Pat. No. 1,145,445 and Japanese Patent Publication No. 22327/1970.

The typical fluorovinyl ethers include:
$CF_2=CFO(CF_2)_{1-8}COOCH_3$,
$CF_2=CFO(CF_2)_{1-8}COF$,
$CF_2=CFO(CF_2)_{1-8}CONH_2$ and
$CF_2=CFO(CF_2)_{1-8}COOC_2H_5$.

These fluorovinyl ethers can be easily obtained by the processes described in Japanese Unexamined Patent Publications Nos. 78827/1977, and 105118/1977.

In the copolymerization of the invention, it is preferable to have a smaller amount of the fluorovinyl ether monomer and to be in a range of 0.1 to 10 mole %. When the amount is too small, the mechanical characteristics of the copolymers at high temperature are not improved effectively. On the contrary, when the amount is too much, the rate of the copolymerization is too low for the industrial operation, and the tensile creep property and heat resistance of the resultant terpolymers are inferior to those of the copolymers having no additional component. It is preferable to add 0.3 to 5 mole % of the fluorovinyl ether monomer in order to produce terpolymers which exhibit excellent properties in an industrial scale operation.

It is preferable to supply the fluorovinyl ether monomer corresponding to the consumed amount during the copolymerization so as to keep the concentration of the fluorovinyl ether monomer constant. In the invention, a small amount of the fluorovinyl ether component is included in the terpolymer and is preferably in a range of about 0.1 to 10 mole % especially 0.3 to 5 mole %. Accordingly, during the copolymerization, it is preferable to add 0.1 to 10 mole % preferably 0.3 to 5 mole % of the fluorovinyl ether monomer together with tetrafluoroethylene and ethylene, whereby the terpolymers of tetrafluoroethylene and ethylene including 0.1 to 10 mole % preferably 0.3 to 5 mole % of the fluorovinyl ether component can be obtained. The content of the fluorovinyl ether component in the terpolymer is calculated from a difference between the amount of the monomer fed in the reactor and the amount of the monomer recovered after the copolymerization.

When the content of the fluorovinyl ether component in the resulting terpolymer is too small, the effect for improving the mechanical characteristics at high temperature is not found, whereas when it is too much, the tensile creep property and the heat resistance in ageing are inferior to form excessively soft products.

The tensile strength and elongation of the conventional copolymer of tetrafluoroethylene and ethylene at 200° C. are respectively as high as 20 Kg/cm$^2$ and as high as 40%, whereas the tensile strength and elongation of the terpolymer including the fluorovinyl ether component are respectively higher than 30 Kg/cm$^2$ especially 40 to 80 Kg/cm$^2$ and higher than 200% especially 400 to 600%. The disadvantages of brittle coating on a wire at high temperature and cracks under low stress can be overcome.

The copolymerization reaction of this invention can be carried out by the action of a polymerization initiator, such as a peroxy compound, azo compound, ultraviolet radiation or high energy ionizing radiation, with or without an inert organic solvent or an aqueous medium.

The polymerization can be carried out by a bulk polymerization, a solution polymerization, a suspension polymerization, an emulsion polymerization or a vapor phase polymerization.

According to the studies for this invention, it is found to be advantageous to use a saturated fluoro- or chlorofluoro-hydrocarbon, (preferably 1 to 4 especially 1 to 2 of carbon atoms) known as a freon type solvent, as the copolymerization reaction medium in order to control the reaction conditions and to increase the reaction rate in an industrial operation. Moreover, the thermal stability, melt processability and chemical resistance of the resultant terpolymer can be controlled by the solvent system. Suitable such freon type solvents include: dichlorodifluoromethane, trichloromonofluoromethane, dichloromonofluoromethane, monochlorodifluoromethane, chlorotrifluoromethane, fluoroform, tetrafluoroethane, trichlorotrifluoroethane, dichlorotetrafluoroethane, hexafluoroethane, fluorochloropropane, perfluoropropane, fluorocyclobutane, perfluorocyclobutane, etc. or mixtures thereof. It is best to use a saturated fluoro- or chlorofluoro-hydrocarbon which does not have a hydrogen atom in the molecule, such as dichlorodifluoromethane, trichloromonofluoromethane, trichlorotrifluoroethane, dichlorotetrafluoroethane, perfluorocyclobutane, etc., since such solvents have a tendency of increasing the molecular weight of the resulting copolymer. In general, suitable chlorofluorocarbons are those containing 1-4 carbon atoms, and especially 1-2 carbon atoms. When a freon type solvent is used, the amount used is not limited, although good results are attainable when used in amounts of 0.05-20 mole and especially about 1-10 mole of the solvent per mole of monomer mixture of tetrafluoroethylene, ethylene and fluorovinyl ether monomer.

The copolymerization reaction can be carried out by using less than 0.05 mole of the solvent per mole of monomer mixture. However, it is advantageous to use more than 1 mole of solvent in order to enhance the rate of the copolymerization. It is possible to use more than 20 moles of solvent, but it is advantageous to use less than 10 moles per mole of monomer mixture for economic reasons, such as the solvent recovery.

A mixture of freon type solvents and other organic solvents or aqueous medium may be used. For example, it is possible to use a mixed reaction medium of freon type solvent and water.

The advantage of using such a mixed solvent consists in easy stirring of the reaction system and easy removal of the heat of reaction.

In accordance with the process of the invention, the conditions of the copolymerization can be varied depending upon the type of polymerization initiator or the reaction medium. When a freon type solvent is used, the reaction temperature is preferably in a range of $-50°$ C. to $+150°$ C. and especially 20° to 100° C. in the industrial operation. The reaction temperature can be determined depending upon the type and amount of solvent, the feed molar ratio of the monomers, the amount of the fluorovinyl ether monomer, and the type of the polymerization initiator, etc. When the reaction temperature is too high, the reaction pressure becomes too high. On the other hand, when the reaction temperature is too low, the rate of the copolymerization is lower than the range considered acceptable for industrial operation. The reaction pressure may range from atmospheric pressure upward and preferably from 2 to 50 Kg/cm$^2$(gauge). Higher or lower pressure can be used if desired.

As indicated above, a wide variety of polymerization initiators can be used depending upon the polymerization system. However, when a freon type solvent is used, it is preferable to use high energy ionizing radiation, such as $\gamma$-rays from such radioactive elements as cobalt 60 or cesium 137, or to use a soluble radical polymerization initiator, such as an organic peroxy compound or an azo compound. For example, it is possible to use high energy ionizing radiation of $10-16^6$ rad/hour of the dose rate.

Suitable peroxy compounds as the free radical initiator may be the organic peroxides, e.g., benzoylperoxide or lauroylperoxide; the peresters, e.g., t-butyl peroxyisobutyrate; the peroxy dicarbonate, e.g., diisopropylperoxy dicarbonate, etc., or the azo compounds, such as azobisisobutyronitrile, etc.

The quantity of the radical initiator is selected depending upon the condition of the copolymerization, the amount of the specific fluorovinyl ether, the kind of the medium and the polymerization temperature and it is usually in a range of about 0.0001 to 2 wt.% to the total charged monomers.

In order to obtain the desirable terpolymers of the present invention, it is especially preferable to use as the initiator, a peroxyester type peroxide having the formula

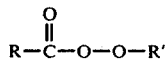

wherein R and R' each represent aliphatic alkyl groups in a freon type solvent. This feature is advantageous to give suitable reaction velocity of the copolymerization, suitable properties of the resulting copolymers and suitable operation of the copolymerizations.

In the formula, R and R' are respectively aliphatic alkyl groups which are preferably $C_3$–$C_{13}$ alkyl groups. Suitable peroxyester type peroxides include t-butyl peroxyisobutyrate, t-butyl peroxyacetate, t-butyl peroxypivalate, t-butyl peroxy-2-ethylhexanoate, and t-butyl peroxylaurate, etc.

In general, good results are attainable when the initiator is used in amounts of more than about 0.001 part by weight per 100 parts by weight of total monomers. The concentration of the free radical initiator in the freon type solvent is usually in a range of 0.005 to 5 parts by weight per 100 parts by weight of total monomers initially charged.

The amount of the freon type solvent is usually in a range of about 1 to 10 mole especially 1.5 to 5 mole per 1 mole of total monomer initially charged. The temperature for copolymerization is usually about 30° to 120° C., and will be largely dependent upon the half-life of the initiator used. For example, it is 50° to 80° C. when t-butyl peroxyisobutyrate is used, and it is 40° to 60° C. when t-butyl peroxypivalate is used. In general, it is possible to obtain the terpolymer in high yield without spending a long time by selecting the appropriate reaction temperature.

When a freon type solvent is used, the solvent can be easily separated together with the unreacted monomers from the resulting terpolymers after the copolymerization. The terpolymer of this invention can be safely produced in a freon type solvent with a desirable polymerization rate, since the reaction pressure in chlorofluorocarbon can be lower than that in an aqueous medium. Moreover, the reaction velocity of the copolymerization is high enough sufficient to the industrial operation.

Having generally described the invention, a further understanding can be attained by reference to certain specific Examples which are provided herein for purposes of illustration only and are not intended to be limiting in any manner unless otherwise specified. In the examples, the physical properties of the copolymers were measured by the following methods.

Tensile strength and elongation at high temperature

They were measured by the ASTM D-638 using a specimen of JIS No. 1 at 200° C. under a tensile speed of 200 mm/min.

EXAMPLE 1

In a 2 liter autoclave, 825 g of trichloromonofluoromethane, 1125 g of trichlorotrifluoroethane and 0.43 g of t-butylperoxy isobutyrate were charged. Then, 250 g of tetrafluoroethylene, 17.5 g of ethylene and 6.7 g of methyl perfluoro-5-oxy-6-heptenoate ($CF_2$=$CFOCF_2CF_2CF_2COOCH_3$) were charged in it.

The copolymerization was carried out with stirring the mixture at 65° C. During the copolymerization, a monomer mixture of tetrafluoroethylene, ethylene and methyl perfluoro-5-oxy-6-heptenoate at molar ratios of 53:46.3:0.7 was fed to maintain the pressure of 15.0 Kg/cm².

After 3 hours, 75 g of white terpolymer was obtained.

The terpolymer had the components at molar ratios of $C_2F_4$:$C_2H_4$:$CF_2$=$CFO(CF_2)_3COOCH_3$ of 53:46.3:0.7 and a melting point of 267° C., a thermal decomposition temperature of 355° C., a volumetric flow rate of 85 mm³/sec. A sheet obtained by compressing the terpolymer at 300° C. for 10 minutes, was milky white and translucent without any symptom of thermal decomposition such as coloring.

The tensile strength and elongation of the sheet of the terpolymer (thickness of 1.3 mm) at 200° C. were respectively 40 Kg/cm² and 470%.

EXAMPLE 2

In accordance with the process of Example 1 except charging 726 g of trichlorotrifluoromethane and 1260 g of trichlorotrifluoroethane in the autoclave, the copolymerization was carried out. After 5 hours, 92 g of white terpolymer was obtained.

The terpolymer had the same monomer unit ratios and the same melting point and the same thermal decomposition temperature than those of Example 1, however the terpolymer flow rate of 50 mm³/sec. and a tensile strength of 52 Kg/cm² at 200° C. and an elongation of 550% at 200° C. In the Mandrel wrap test, no crack was formed in the test piece at higher than 220° C.

EXAMPLE 3

In accordance with the process of Example 1 except charging 14.3 g of methyl perfluoro-5-oxy-6-heptenoate in an autoclave and feeding the monomer mixture at molar ratios of $C_2F_4$:$C_2H_4$:$CF_2$=$CFO(CF_2)_3COOCH_3$ of 53:45.5:1.5, during the copolymerization, the copolymerization was carried out.

After 3 hours, 85 g of white terpolymer was obtained.

The terpolymer had the components at molar ratios of $C_2F_4$:$C_2H_4$:$CF_2$=$CFO(CF_2)_3COOC_2H_5$ of 53:45.5:1.5 and a melting point of 258° C., a thermal decomposition temperature of 355° C.; a volumetric flow rate of 92 mm³/sec. and a tensile strength of 42 Kg/cm² at 200° C. and an elongation of 510% at 200° C. In the Mandrel wrap test, no crack was formed in the test piece at higher than 220° C. even at 250° C. near the melting point.

EXAMPLE 4

In accordance with the process of Example 1 except charging 6.4 g of perfluoro-5-oxy-6-heptenoic acid fluoride ($CF_2$=$CFOCF_2CF_2CF_2COF$) instead of methyl perfluoro-5-oxy-6-heptenoate in the autoclave, and feeding the monomer mixture containing 0.7 mole % of perfluoro-5-oxy-6-heptenoic acid fluoride, during the reaction, the copolymerization was carried out.

After 4.5 hours, 90 g of white terpolymer was obtained. The terpolymer had a thermal decomposition temperature of 354° C., a melting point of 267° C., a volumetric flow rate of 88 mm³/sec., a tensile strength of 42 Kg/cm² at 200° C. and an elongation of 450% at 200° C.

EXAMPLE 5

In a 1 liter autoclave, 363 g of trichloromonofluoromethane, 630 g of trichlorotrifluoroethane and 0.22 g of t-butylperoxyisobutylate were charged and then, 125 g of tetrafluoroethylene, 8.7 g of ethylene and 4.4 g of methyl perfluoro-7-oxy-8-nonoate ($CF_2$=$CFO(CF_2)_5COOCH_3$) were charged.

The copolymerization was carried out with stirring the mixture at 65° C. During the copolymerization, a monomer mixture of tetrafluoroethylene, ethylene and methyl perfluoro-7-oxy-8-nonoate at molar ratios of 53:46.3:0.7 was fed to maintain the pressure of 15 Kg/cm$^2$.

After 3.5 hours, 40 g of white terpolymer was obtained.

The terpolymer had the components at molar ratios of $C_2F_4:C_2H_4:CFO(CF_2)COOCH_3$ of 53:46.3:0.7 and a melting point of 266° C., a thermal decomposition temperature of 354° C., a tensile strength of 38 Kg/cm$^2$ at 200° C. and an elongation of 480% at 200° C.

EXAMPLE 6

In accordance with the process of Example 1 except charging 7.0 g of ethyl perfluoro-5-oxy-6-heptenoate ($CF_2=CFO(CF_2)_3-CO_2CH_2CH_3$) and feeding a monomer mixture at molar ratios of ethylene tetrafluoride:ethylene:ethyl perfluoro-5-oxy-6-heptenoate of 53:46.3:0.7, the copolymerization was carried out. The terpolymer had a melting point of 266° C., a volumetric flow rate of 90 mm$^3$/sec., a tensile strength of 40 Kg/cm$^2$ at 200° C. and an elongation of 430% at 200° C.

EXAMPLE 7

In a 2 liter autoclave, 12 g of trichloromonofluoromethane, 968 g of trichlorotrifluoromethane and 0.52 g of t-butyl peroxyisobutyrate were charged and then, 489 g of tetrafluoroethylene, 32.8 g of ethylene and 13.7 g of perfluoro-5-oxy-6-heptenoic acid amide ($CF_2=CFOCF_2CF_2CF_2CONH_2$) were charged. The copolymerization was carried out with stirring the mixture at 65° C. During the copolymerization for 40 minutes, the pressure in the autoclave was fallen from 25.5 Kg/cm$^2$ to 23.2 Kg/cm$^2$.

At this time, the unreacted monomer and the freon type solvent were separated to obtain 55.2 g of white terpolymer.

The terpolymer had a melting point of 268° C., a thermal decomposition temperature of 384° C. and a volumetric flow rate of 43 mm$^3$/sec.

In the infrared spectrum, the absorption of $-CONH_2$ was found.

The terpolymer was compressed at 300° C. for 10 minutes to form a sheet (thickness: 1.3 mm).

The tensile strength and elongation of the sheet at 200° C. were respectively 50 Kg/cm$^2$ and 500%.

EXAMPLE 8

In accordance with the process of Example 8 except charging 1060 g of trichloromonofluoromethane, 620 g of trichlorotrifluoroethane and 0.52 g of t-butyl peroxyisobutyrate and also charging 497 g of tetrafluoroethylene, 32.4 g of ethylene and 27.4 g of perfluoro-5-oxy-6-heptenoic acid amide, the copolymerization was carried out.

After 70 minutes, the inner pressure of the autoclave falls from 24.8 Kg/cm$^2$ to 22.6 Kg/cm$^2$ and 74.0 g of white terpolymer was obtained.

The terpolymer had a melting point of 265° C., a thermal decomposition temperature and a volumetric flow rate of 34 mm$^3$/sec. and a tensile strength of 45 Kg/cm$^2$ at 250° C. and the elongation of 700% at 250° C.

REFERENCE 1

In a 2 liter autoclave, 825 g of trichloromonofluoromethane, 1,125 g of trichlorotrifluoroethane and 0.43 g of t-butyl peroxyisobutyrate were charged and then, 250 g of tetrafluoroethylene, and 17.4 g of ethylene were charged. The copolymerization was carried out with stirring the mixture at 65° C. During the copolymerization, a monomer mixture of tetrafluoroethylene and ethylene at molar ratio of 53:47 was fed to maintain the pressure of 15.0 Kg/cm$^2$.

The terpolymer had the components at molar ratio of $C_2F_4:C_2H_4$ of 53:47 and a melting point of 267° C., a thermal decomposition temperature of 355° C., a volumetric flow rate of 85 mm$^3$/sec. The tensile strength and elongation of the sheet of the terpolymer at 200° C. were respectively about 0.

In the Mandrel wrap test, many cracks were found in the test piece at 120° C.

What is claimed is:

1. A terpolymer having a volumetric flow rate of 10 to 500 mm$^3$/sec. as determined at 300° C. under a load of 30 Kg/cm$^3$, a thermal decomposition temperature higher than 310° C., a tensile strength higher than 30 Kg/cm$^2$ at 200° C. and an elongation higher than 200% at 200° C., containing main components of tetrafluoroethylene and ethylene which consists essentially of 40 to 60 mole % of tetrafluoroethylene, 40 to 60 mole % of ethylene and 0.1 to 10 mole % of a fluorovinyl ether monomer having the formula

$$CF_2=CF-O-(CF_2)_n-COX$$

wherein X represents F, OH, OR$^1$ or NR$^2$R$^3$ and R$^1$ represents a $C_1-C_{10}$ alkyl group and R$^2$ and R$^3$ respectively hydrogen atom or R$^1$, and n represents an integer of 1 to 10.

2. A terpolymer according to claim 1 wherein the fluorovinyl ether is the compound having the formula

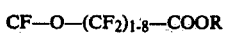
$$CF-O-(CF_2)_{1-8}-COOR$$

wherein R represents a $C_1-C_5$ alkyl group.

3. A terpolymer according to claim 1 wherein the fluorovinyl ether is the compound having the formula

$$CF_2=CF-O-(CF_2)_{1-8}-COF.$$

4. A terpolymer according to claim 1 wherein the fluorovinyl ether is the compound having the formula

$$CF_2=CF-O-(CF_2)_{1-8}-CONR^4R^5$$

wherein R$^4$ and R$^5$ respectively represent hydrogen atom or a $C_1-C_5$ alkyl group.

5. A terpolymer according to claim 1 wherein the content of the fluorovinyl ether component is in a range of 0.3 to 5 mole %.

6. A terpolymer according to claim 1 wherein a molar ratio of components of $C_2F_4:C_2H_4$ is in a range of 45:55 to 55:45.

7. A terpolymer according to claim 1 or 6 wherein a molar ratio of components of $C_2F_4:C_2H_4$ is more than 50:50.

8. A terpolymer according to claim 1 wherein the volumetric flow rate of the terpolymer is in a range of 20 to 200 mm$^3$/sec.

9. A terpolymer according to claim 1 wherein a flowing temperature is higher than 240° C.

10. A process for producing a terpolymer of tetrafluoroethylene and ethylene containing 0.1 to 10 mole % of a fluorovinyl ether component which has a volumetric flow rate of 10 to 500 mm$^3$/sec. at 300° C. under a load of 30 Kg/cm$^2$, a thermal decomposition temperature higher than 310° C., a tensile strength higher than 30 Kg/cm² at 200° C., and an elongation higher than 200% at 200° C., which comprises:

copolymerizing tetrafluoroethylene, ethylene and a small amount of a fluorovinyl ether monomer having the formula:

$$CF_2=CF-O-(CF_2)_n-COX$$

wherein X represents F, OH, OR¹ or NR²R³ and R¹ represents a $C_1-C_{10}$ alkyl group and R² and R³ respectively represent hydrogen atom or R¹; n represents an integer of 1 to 10, in the presence of a polymerization initiator while maintaining a molar ratio of $C_2F_4$ to $C_2H_4$ higher than 40/60.

11. A process according to claim 10 wherein the feed molar ratio of $C_2F_4$ to $C_2H_4$ is higher than 70/30.

12. A process according to claims 10 or 11 wherein the feed molar ratio of $C_2F_4$ to $C_2H_4$ is higher than 75/25.

13. A process according to claim 11 wherein the initial feed molar ratio of $C_2F_4$ to $C_2H_4$ is in a range of 70/30 to 90/10 and a monomer mixture of tetrafluoroethylene and ethylene with a molar ratio of $C_2F_4$ to $C_2H_4$ of 40/60 to 60/40 is fed during the copolymerization.

14. A process according to claim 12 wherein the initial feed molar ratio of $C_2F_4$ to $C_2H_4$ is in a range of 75/25 to 85/15 and a monomer mixture of tetrafluoroethylene and ethylene with a molar ratio of $C_2F_4$ to $C_2H_4$ of 45/55 to 55/45 is fed during the copolymerization.

15. A process according to claim 10 wherein the fluorovinyl ether is a compound having the formula $$CF_2=CF-O-(CF_2)_{1-8}-COOR$$

wherein R represents a $C_1-C_5$ alkyl group.

16. A process according to claim 10 wherein the fluorovinyl ether is a compound having the formula $$CF_2=CF-O-(CF_2)_{1-8}-COF.$$

17. A process according to claim 10 wherein the fluorovinyl ether is a compound having the formula $$CF_2=CF-O-(CF_2)_{1-8}-CONR^4R^5$$

wherein R⁴ and R⁵ respectively represent hydrogen atom or a $C_1-C_5$ alkyl group.

18. A process according to claims 10, 15, 16 or 17 wherein the mole % of the fluorovinyl ether monomer is kept essentially in the range of from 0.1 to 10 based on total monomers throughout the copolymerization.

19. A process according to claim 10 wherein the mole % of the fluorovinyl ether monomer is kept essentially in the range of from 0.3 to 5 based on total monomers throughout the copolymerization.

20. A process according to claim 10 wherein the copolymerization is carried out in a solvent of saturated fluoro- or chlorofluorohydrocarbon.

21. A process according to claim 10 or 20 wherein the copolymerization is carried out in a saturated fluoro- or chlorofluoro-carbon solvent.

22. A process according to claim 20 wherein 0.05 to 20 mole of the solvent per 1 mole of initially charged total monomers is used.

23. A process according to claim 20 wherein the copolymerization is carried out at $-50°$ C. to 150° C.

24. A process according to claim 20 wherein the copolymerization is carried out under pressure of 2 to 50 Kg/cm²(gauge).

25. A process according to claims 10 or 22 wherein the polymerization initiator is an ionizing radiation.

26. A process according to claim 10, wherein the polymerization initiator is a radical initiator.

27. A process according to claim 26 wherein the radical initiator is a peroxy ester.

28. A process according to claim 26 or 27 wherein the radical initiator is added at a ratio of 0.001 to 2 wt. % to initially charged total monomers.

29. A process according to claim 10 wherein a radical initiator of peroxy ester having the formula $$R-\overset{\overset{O}{\|}}{C}-O-O-R'$$

wherein R and R' respectively represent an aliphatic alkyl group is used as the polymerization initiator with the saturated fluoro- or chlorofluoro-hydrocarbon solvent.

30. A process according to claim 23 wherein the copolymerization is carried out at 30° to 120° C.

31. A process according to claim 22 wherein 1 to 10 mole of the solvent per 1 mole of initially charged monomers is used.

* * * * *